March 12, 1968

P. UEBEL 3,372,759

MEANS FOR SUPPRESSING BLOWS, SHOCKS OR VIBRATIONS IN THE
OPERATION OF AN APPARATUS SUCH AS A POWER
DRIVEN HAMMER OR TAMPER

Filed Oct. 21, 1965

INVENTOR.
PHILIPP UEBEL

BY Robert H. Jacob

AGT.

United States Patent Office 3,372,759
Patented Mar. 12, 1968

3,372,759
MEANS FOR SUPPRESSING BLOWS, SHOCKS OR VIBRATIONS IN THE OPERATION OF AN APPARATUS SUCH AS A POWER DRIVEN HAMMER OR TAMPER
Philipp Uebel, Munich, Germany, assignor to Hermann Wacker and Peter Wacker, Munich, Germany
Filed Oct. 21, 1965, Ser. No. 499,940
Claims priority, application Germany, Oct. 28, 1964, W 37,859
1 Claim. (Cl. 173—162)

ABSTRACT OF THE DISCLOSURE

Shock suppressing means for manually guided power driven hammers or tampers having a housing and a handle, where the handle is disposed at the center of gravity at the end of one of two angular levers which are connected with one another at the other end by an oscillating element or shock mount.

---

The present invention relates to power driven equipment or apparatus such as hammers or tampers that produce blows, shocks or vibrations during their operation, and is particularly concerned with means for attenuating the transmission of such blows, shocks or vibrations.

It is an object of the present invention to dampen the transmission of the blows or vibrations produced by motor driven equipment to the operator of the equipment in a manner that operation over a rlatively long period of time is made possible, without detracting in any way from the control or guidance of the equipment.

Arrangements for dampening the transmission of blows, shocks or vibrations in the operation of power driven equipment are already known. Thus, for example, it is not new in rapidly beating tampers to arrange an operating handle over vibrating metal elements on the housing of the equipment.

In power driven hammers relief is sought by suitably constructing the handles, for example, with sponge rubber covers. In spite of this measure it is not possible to work with such equipment over lengthy time periods.

Attempts have also been made in connection with power driven hammers to introduce an oscillating metal member between the handle and the housing of the equipment, as has been done in rapidly beating tampers, but here the oscillating metal element is subject to such loads, particularly tension loads, that the life of such elements is very limited. Moreover, with this type of construction the handling of the equipment becomes rather unstable.

For that reason a type of handle construction has already been proposed, especially for power hammers, where the handle is located outside of the center of gravity of the equipment on a lever arm above a torsion sleeve. This avoids straining of the oscillating shock mount element especially with forces of tension, but the guiding of the equipment is encumbered by the unfavorable location of the center of gravity.

In accordance with the invention the disadvantages and shortcomings of the known embodiments are eliminated by a double angle construction with a guide bearing. In this manner the mounting of the manipulating handle can be arranged at the center of gravity of the equipment, while at the same time the oscillating element or shock mount that is arranged between the housing and the gripping handle is relieved of tension loads, and therefore its wear is improved. Furthermore, this arrangement insures of free attenuation of the oscillations of the dampened gripping handle without introducing instability in the guidance or control of the equipment.

Figure 1:
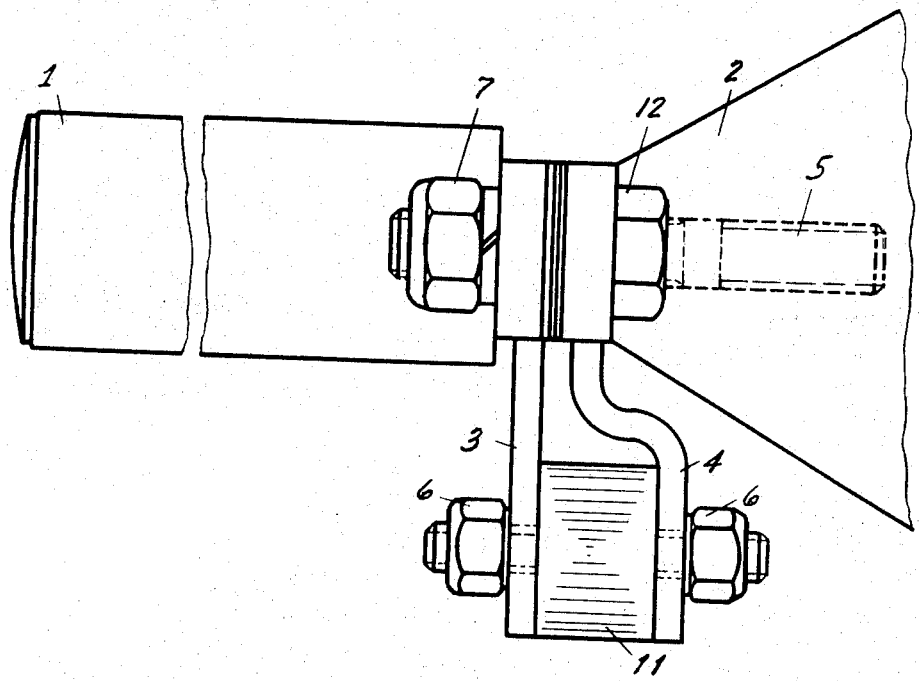
Figure 2:
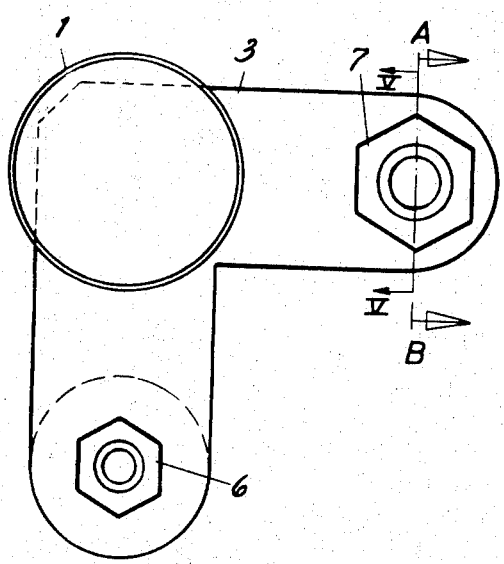
Figure 3:
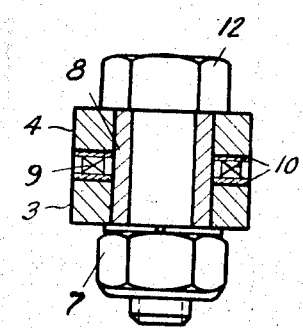
Figure 4:
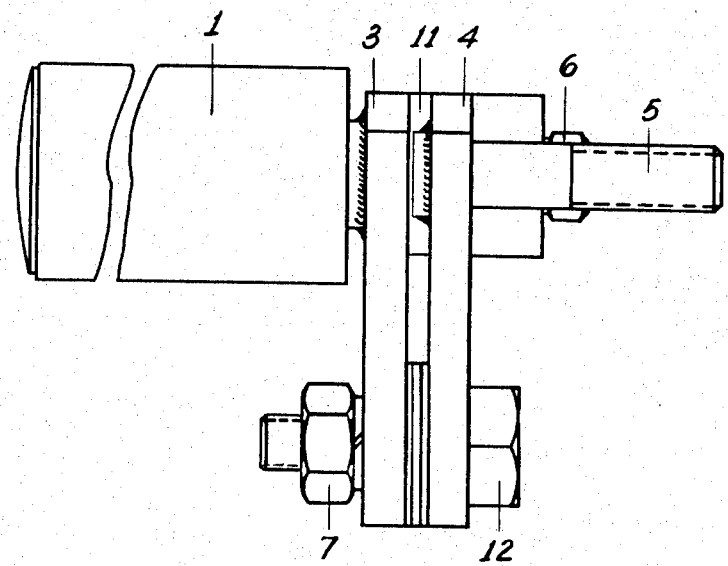
Figure 5:
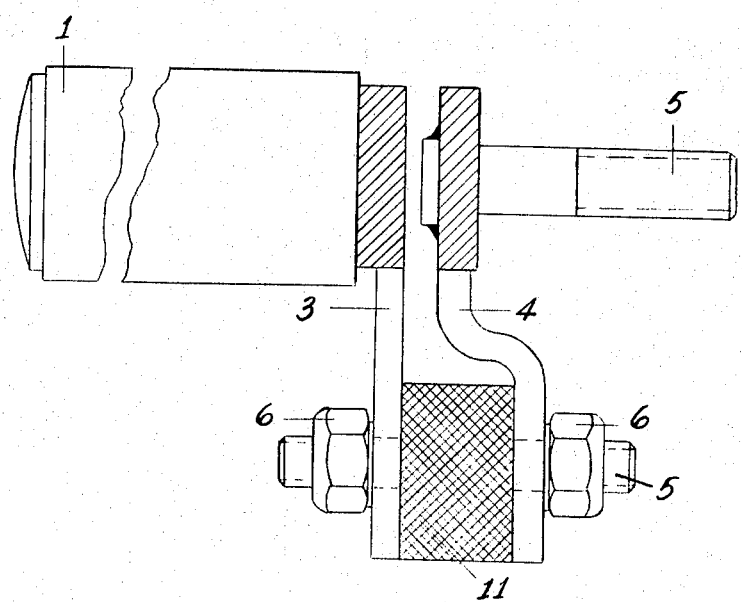

Further objects and advantages of the invention will become apparent from the following description with reference to the accompanying drawings, in which FIG. 1 illustrates a gripping handle in accordance with the invention, FIG. 2 is a side view thereof showing the angle iron, FIG. 3 is a section taken along line A–B in FIG. 2 showing the disposition of the guidance bearing, FIG. 4 is a top view of the device illustrated in FIG. 1, and FIG. 5 is a view taken in the direction of the arrows V—V in FIG. 2.

The gripping handle 1 of a power tool 2 is rigidly connected with a flat angle iron 3. An angularly bent angle iron 4 is rigidly connected with a bolt 5 which in turn is also secured to the housing 2 of the power tool. The flat angle iron 3 and the angularly bent angle iron 4 are connected at one end by means of a shock mount element 11 which in turn is secured between the two ends of the angle irons. At the other ends of the angle irons an axial bearing 9 is provided between two discs 10, while the connection between the two angle irons 3, 4 is provided by way of a sleeve 8 with a screw 12 and a nut 7.

It is to be noted that the sleeve 8 is a pure spacing sleeve which insures that in spite of firmly tightening the nut 7 and the screw 12 the necessary play is allowed for the bearing 9 to perform its function. It is important that the tolerance for bearing 9 is neither too much nor too little. The function of bearing 9 is that also with rapidly beating tools the friction and therefore the wear can be reduced to a minimum, and the position of the angle irons 3 and 4 is so fixed that only the vertical resilience effect of the shock mount 11 is received at the handle. This insures that the handle which is fastened only from one side retains its position perpendicularly with respect to the tool, and therefore bending of the shock mount 11, which would introduce an additional pulling load, is prevented.

By virtue of this arrangement the stable guidance of the gripping handle arranged at the center of gravity of the power tool is accomplished. At the same time, however, the two angle irons can be slightly displaced with respect to one another so that the shock mount element is not subjected to tensional stress and is, therefore, improved for longer wear.

Having now described my invention with reference to the embodiment illustrated in the accompanying drawings, I do not wish to be limited thereto, but what I desire to protect by Letters Patent is set forth in the appended claim.

I claim:

1. Means for attenuating the transmission of blows, shocks or vibration during the operation of a power driven tool device such as a hammer, tamper or the like and of the type having a housing and a gripping handle for manipulating the device, said means comprising a pair of angle irons disposed intermediate said handle and said housing, one said angle iron being flat and rigidly secured to said handle, the other said angle iron being secured at one end to said housing, extending parallel to said flat angle iron and being angularly offset at its other end relative to said flat angle iron, said angle irons being connected at their said one ends by means of a sleeve extending therethrough, a bolt extending through said sleeve, a nut threaded to said bolt, an axial bearing disposed between disks around said bolt intermediate said one ends in a manner to permit slight relative movement, and being connected at their other ends by way of a shock mount element disposed about a bolt extending between said angle irons.

References Cited
UNITED STATES PATENTS

| | | | |
|---|---|---|---|
| 1,399,387 | 12/1921 | Jackson | 173—162 X |
| 1,667,280 | 4/1928 | Blanding | 173—162 X |
| 1,868,627 | 7/1932 | Coates | 173—162 |
| 2,630,784 | 3/1953 | Wallerstein | 173—162 X |
| 3,275,089 | 9/1966 | Kaiser et al. | 173—162 |

ERNEST R. PURSER, *Primary Examiner.*

NILE C. BYERS, JR., FRED C. MATTERN, *Examiners.*

L. P. KESSLER, *Assistant Examiner.*